US010465050B2

(12) United States Patent
Van Duin et al.

(10) Patent No.: US 10,465,050 B2
(45) Date of Patent: Nov. 5, 2019

(54) VULCANIZABLE POLYMER COMPOSITION

(71) Applicant: ARLANXEO Netherlands B.V., Geleen (NL)

(72) Inventors: Martin Van Duin, Sittard (NL); Philip James Hough, Grevenbicht (NL)

(73) Assignee: LANXESS Deutschland GmbH, Cologne (DE)

( * ) Notice: Subject to any disclaimer, the term of this patent is extended or adjusted under 35 U.S.C. 154(b) by 433 days.

(21) Appl. No.: 15/102,044

(22) PCT Filed: Dec. 1, 2014

(86) PCT No.: PCT/EP2014/076125
§ 371 (c)(1),
(2) Date: Jun. 6, 2016

(87) PCT Pub. No.: WO2015/090922
PCT Pub. Date: Jun. 25, 2015

(65) Prior Publication Data
US 2017/0015796 A1    Jan. 19, 2017

(30) Foreign Application Priority Data

Dec. 17, 2013  (EP) .................................... 13197746

(51) Int. Cl.
| *C08J 3/24* | (2006.01) |
| *C08L 23/16* | (2006.01) |
| *C08K 3/34* | (2006.01) |
| *B29C 35/02* | (2006.01) |
| *B29C 48/00* | (2019.01) |
| *C08K 5/14* | (2006.01) |
| *B29C 43/00* | (2006.01) |
| *B29C 43/24* | (2006.01) |
| *B29C 45/00* | (2006.01) |
| *C08K 3/26* | (2006.01) |
| *C08K 3/36* | (2006.01) |
| *B29K 21/00* | (2006.01) |

(52) U.S. Cl.
CPC ................ *C08J 3/24* (2013.01); *B29C 35/02* (2013.01); *B29C 43/003* (2013.01); *B29C 43/24* (2013.01); *B29C 45/0001* (2013.01); *B29C 48/022* (2019.02); *C08K 3/26* (2013.01); *C08K 3/34* (2013.01); *C08K 3/36* (2013.01); *C08K 5/14* (2013.01); *B29K 2021/00* (2013.01); *C08J 2323/08* (2013.01); *C08K 2003/265* (2013.01); *C08K 2201/006* (2013.01)

(58) Field of Classification Search
None
See application file for complete search history.

(56) References Cited

U.S. PATENT DOCUMENTS

| 3,036,980 | A  | 5/1962  | Dunham, Jr. et al. |
| 4,680,319 | A  | 7/1987  | Gimpel et al. |
| 5,648,413 | A  | 7/1997  | Sato et al. |
| 6,395,816 | B2 | 5/2002  | Kataoka |
| 6,413,201 | B1 | 7/2002  | Ikemoto et al. |
| 7,446,132 | B2 | 11/2008 | Carcich |
| 7,687,559 | B2 | 3/2010  | Kim |
| 2009/0093580 | A1 | 4/2009 | Nakano et al. |
| 2012/0225963 | A1* | 9/2012 | Duin ................. C08L 21/00 521/136 |
| 2013/0274360 | A1 | 10/2013 | Hough et al. |

FOREIGN PATENT DOCUMENTS

| CN | 1727387 A    | 2/2006 |
| EP | 1479721 A1   | 11/2004 |
| JP | 2001226530 A2 | 8/2001 |
| JP | 2003221468 A2 | 8/2003 |
| JP | 2010150417 A2 | 7/2010 |

OTHER PUBLICATIONS

Lanxess Technical Rubber Products Range Mar. 2012. (Year: 2012).*
Computer-generated English-language translation of CN 1727387 A.*
Database WPI, Week 200704, Thomson Scientific, London, GB, AN 2007-026574.
International Search Report from International Application No. PCT/EP2014/076125, dated Feb. 11, 2015, three pages.
Dluzneski, Peter R. , "Peroxide Vulcanization of Elastomers", Rubber Chemistry & Technology, 2001, American Chemical Society, pp. 451-492.

* cited by examiner

*Primary Examiner* — Vu A Nguyen

(57) ABSTRACT

The invention relates to a vulcanizable polymer composition comprising
a) an polymer having an iodine value of lower than 400 g/100 g polymer, whereby the polymer is an elastomeric polymer that is a copolymer of ethylene, one or more C3 to C23 α-olefins and a polyene monomer, preferably a copolymer of ethylene, propylene and a polyene monomer are
b) an organic peroxide having aromatic groups and
c) a zeolite having a pore size of 3 to 6 Å.

16 Claims, No Drawings

VULCANIZABLE POLYMER COMPOSITION

The invention is related to a vulcanizable polymer composition comprising a certain polymer, a peroxide with aromatic groups and a certain zeolite. The invention also relates to a process for the manufacture of a vulcanized article comprising from said composition as well as the respective vulcanized article.

Vulcanizable rubber compositions comprising an elastomeric polymer containing peroxide cross-linkers are broadly applied in the industry. Such application is mentioned in the review of P. Dluzneski, Rubber Chemistry and Technology 74 (2001) 451-492.

As illustrated in this review, there are quite a number of chemicals known in the public domain, such as i) co-agents, ii) scorch inhibitors and iii) activators, that beneficially affect the characteristics of peroxide curing of polymers and elastomers in particular and, thus, are applied in industry for fine-tuning the peroxide curing performance.

However, some of them provide in addition some side effects that may limit the scope of application.

The purpose of the invention is to provide a new vulcanizable polymer rubber composition having improved state of cure. This objective is reached by a vulcanizable polymer composition described below. Surprisingly the polymer composition according to the invention provides improved state of cure. Furthermore, such a polymer composition should also have improved mechanical properties of the vulcanized article, reflected in higher hardness and modulus and reduced compression set over a wide temperature range.

SUMMARY OF THE INVENTION

The invention relates to a vulcanizable polymer composition comprising
  a) a polymer having an iodine value of lower than 400 g/100 g polymer, whereby the polymer is an elastomeric polymer that is a copolymer of ethylene, one or more $C_3$ to $C_{23}$ α-olefins and a polyene monomer, preferably a copolymer of ethylene, propylene and a polyene monomer (EPDM),
  b) an organic peroxide having aromatic groups and
  c) a zeolite having a pore size of 3 to 6 Å.

Zeolite has been widely used in rubber compositions, mainly for VOC reduction purposes. In U.S. Pat. No. 7,687,559, the reduction of VOC in rubbers like EPDM for conductive roller application is achieved by the use of zeolite.

In U.S. Pat. No. 6,395,816 a golf ball core made out of polybutadiene is disclosed that enhances the initial velocity of the center core which gets better flying properties of the entire gold ball. This effect is explained by the moisture capturing effect of the zeolite (see col. 1, line 55 to 57).

Also EP1148085 is about absorbing VOC hi form of smell from shoes by an inliner of rubber and zeolite.

U.S. Pat. No. 3,036,980 refers to a zeolite, loaded with a curing agent that is released under vulcanizing conditions. Hence, the zeolite works only as a vehicle for the curing agent to become very comfortable to handle.

Polymer:

Also a preferred polymer of the component a) is an elastomeric polymer of the so called type M rubber according to DIN/ISO 1629. The M rubber includes for example ethylene propylene diene rubber (EPDM).

Preferred elastomeric polymers are M rubbers that are copolymers of ethylene, one or more $C_3$ to $C_{23}$ α-olefins and a polyene monomer. Copolymers of ethylene, propylene and a polyene monomer are most preferred (EPDM). Other α-olefins suitable to form a copolymer include 1-butene, 1-pentene, 1-hexene, 1-octene and styrene, branched chain α-olefins such as 4-methylbut-1-ene, 5-methylpent-1-ene, 6-methylhept-1-ene, or mixtures of said α-olefins.

The polyene monomer may be selected from non-conjugated diaries and trienes. The copolymerization of diene or triene monomers allows introduction of one or more unsaturated bonds.

The non-conjugated diene monomer preferably has from 5 to 14 carbon atoms. Preferably, the diene monomer is characterized by the presence of a vinyl or norbornene group in its structure and can include cyclic and bicycle) compounds. Representative diene monomers include 1,4-hexadiene, 1,4-cyclohexadiene, 1,5-hexadiene, 1,8-heptadiene, 1,7-octadiene, dicyclopentadiene, 5-ethylidene-2-norbornene, 5-vinyl-2-norbornene, 5-methylene-2-norbornene, 1,5-heptadiene, and 1,6-octadiene. The copolymer may comprise a mixture of more than one diene monomer. Preferred non-conjugated diene monomers for preparing a copolymer are 1,4-hexadiene (HD), dicyclopentadiene (DCPD), 5-ethylidene-2-norbornene (ENB) and 5-vinyl-2-norbornene (VNB). ENB is the most preferred polyene.

The triene monomer will have at least two non-conjugated double bonds, and up to about 30 carbon atoms. Typical triene monomers useful in the copolymer of the invention are 1-isopropylidene-3,4,7,7-tetrahydroindene, 1-isopropylidene-dicyclo-pentadiene, dihydro-isodicyclopentadiene, 2-(2-methylene-4-methyl-3-pentenyl) [2,2,1]bicyclo-5-heptene, 5,9-dimethyl-1,4,8-decatriene, 6,10-dimethyl-1,5,9-undecatriene, 4-ethylidene-6,7-dimethyl-1,6-octadiene and 3,4,8-trimethyl-1,4,7-nonatriene.

Ethylene-propylene or higher α-olefin copolymers preferably comprise about 10 to 90 wt. %, preferably 30 to 90 wt. %, more preferably 40 to 80 wt %, in particular 45 to 75 wt. % ethylene derived units, 0.01 to 20 wt. %, preferably 0.5 to 15 wt. %, or more preferably 1 to 10 wt. % polyene-derived units, wherein the balance to 100 wt. % is the amount of the $C_3$ to $C_{23}$ α-olefin derived units.

A preferred elastomeric polymer is an ethylene α-olefin diene rubber obtainable by random copolymerization of ethylene, an α-olefin having 2 to 23 carbon atoms, in particular propylene and a diene selected from the group consisting of 1,4-hexadiene (HD), dicyclopentadiene (DCPD), 5-ethylidene-2-norbornene (ENB) and 5-vinyl-2-norbornene (VNB), in particular ENB or VNB or ENB and VNB.

Strongly preferred elastomer is an ethylene propylene diene rubber co-polymerized by 45 to 75 wt. % of ethylene, 1 to 10 wt. % diene, in particular ENB, and the balance is propylene.

The elastomeric polymer, in particular EPDM is usually and conveniently prepared using a Ziegler-Natty catalyst, a metallocene catalyst or other single site catalysts. In preparing the compositions of the invention, the amount of elastomer preferably is 90 to 10 weight percent, preferably 80 to 20 weight percent, more preferably 50 to 30 weight percent based on the total weight of the elastomer and the thermoplastic resin.

The polymer composition according to the invention may also comprise polymers other than the above described elastomeric polymers. Such polymers include polyethylene, poly-propylene, propylene ethylene rubber (PEM), copolymers of ethylene and butylene, hexylene or octylene, acrylic polymer (e.g. poly(meta)acrylic acid alkyl ester, etc.), polyvinyl chloride, ethylene-vinyl acetate copolymers, polyvinyl acetate, polyamide, polyester, chlorinated polyethylene, urethane polymers, styrene polymers, silicone polymers, styrene-ethylene-butylene styrene block copolymers (SEBS), epoxy resins and other elastomeric polymers like Natural rubber (NR), Nitrile rubber (NBR), hydrogenated or partially hydrogenated nitrile rubber (HNBR), Styrene-butadiene rubber (SBR), Styrene-isoprene-butadiene rubber (SIBR), Butyl rubber (IIR), Polychloroprene (CR), ethylene propylene diene rubber (EPDM), chlorinated polyethylene (CM), chlorosulfonated rubber (CSM), chlorinated isobutylene-isoprene copolymers, in particular with chlorine contents of 0.1 to 10 wt. % (CIIR), brominated isobutylene-isoprene copolymers in particular with bromine contents of 0.1 to 10 wt. % (BIIR), Polyisoprene rubber (IR), ethylene propylene copolymer (EPM), ethylene vinyl acetate rubber (EVM), silicone rubber (QM), fluoro elastomer (FKM) and ethylene acrylate rubber (AEM) or a mixture thereof.

The iodine value is the mass of iodine in grams that is consumed by 100 grams of a the polymer. In a preferred embodiment the iodine value lower than 360 g/100 g polymer. In another preferred embodiment the iodine value of the polymer is in the range of 0 to 100, in particular 0 to 50 g/100 g polymer.

Peroxide

Suitable peroxides of the component b) are di(tert-butylperoxylsopropyl)benzene, dicumyl peroxide, tert-butyl peroxybenzoate, tert-butyl cumyl peroxide, dibenzoyl peroxide, di(2,4-dichlorobenzoyl) dichlorobenzoyl) peroxide, and di(4-methylbenzoyl) peroxide. Preferred peroxides are di(tert-butylperoxyisopropyl)benzene and dicumyl peroxide. The most preferred peroxide is di(tert-butylperoxyisopropyl)benzene.

These peroxides can be used as pure chemicals or as solutions in for example mineral oil or as master batches with for example calcium carbonate, silica and/or a rubber.

Good results are obtained if 0.1-10 parts of a peroxide are present per 100 parts of polymer. Preferably 0.25-5 parts, more preferably 0.5-3 parts of peroxide are present.

Zeolite:

The zeolite as component c) may be those natural or synthetic crystalline alumina-silicate microporous materials having a three-dimensional porous structure. The zeolites can be clearly distinguished by their chemical composition and crystalline structure as determined by X-ray diffraction patterns. Zeolite has already been used in resole cured rubbers for accelerating the curing rates as mentioned in EP2441798. Possible zeolites are already mentioned in Kirk-Othmer Encyclopedia of Chemical Technology.

Due to the presence of alumina, zeolites exhibit a negatively charged framework, which is counter-balanced by positive cations. These cations can be exchanged affecting pore size and adsorption characteristics. Preferably are the potassium, sodium and calcium forms of zeolite A types. The zeolite does have a preferred pore size in the range of 3.5 to 5.5 Angstrom. Consequently such zeolites of the A type are called Zeolite 3A, 4A and 5A respectively. The metal cation might also be ion exchanged with protons.

Further not limiting examples of synthetic zeolites are the zeolite X types and zeolite Y types which are well known to the man skilled in the art. Not limiting examples for naturally occurring zeolites are mordenite, faujasite and erionite. Further not limiting examples of synthetic zeolites are the zeolites belonging to the X and V families and ZSM-5.

The zeolite of component c) might be added to the composition in form of fine powders or as aggregated dispersible particles. To achieve the good dispersion of the zeolite, the zeolite must be in the form of fine, small, dispersible particles that might be aggregated into larger agglomerates or processed into pellets. Generally the dispersed particle size is in the range of 0.01-100 μm and more preferably the zeolite has a particle size below 50 μm. This results in a large number of well dispersed sites within the rubber composition, providing the highest effect in increasing the state of cure of the rubber composition and will not negatively affect surface quality of the shaped and vulcanized article.

The amount of zeolite used in the process according to the invention depends on the required state of cure increasing effect, but also on the type of zeolite used and its pore size. Preferably the level of zeolite is in the range of 0.1 to 20 parts per hundred parts of the polymer of the component a), hereinafter referred to as phr, more preferably between 0.5 and 15 phr and most preferred between 1 and 15 phr.

Further Ingredients

While the inherent state of cure of the vulcanizate based on polymer a) cured with a peroxide of component b) in the presence of the zeolite c) as such might be already sufficient for some applications, commercial practical elastomeric compositions will further comprise a co-agent. The primary function of a co-agent is to increase the state of cure and, therefore, co-agents affect the corresponding physical properties of the vulcanized polymer composition. Some co-agents also increase the rate of curing.

Suitable co-agents used for peroxide curing of rubber are divinylbenzene, triallylcyanurate, triallylisocyanurate, diallyterephthalate, triallylphosphate, ethyleneglycol dimethacrylate, trimethylolpropane trimethacrylate, metal salts of an α, -β-unsaturated carboxylic add, like zinc diacrylate and zinc dimethacrylate, N,N'-m-phenylene bismaleimide and low-molecular-weight high-1,2-vinyl-polybutadiene.

The co-agents can be applied as pure chemicals or as solutions in for example oil or as masterbatches with inert carriers such as clay and silica.

Good results are obtained with up to 10 parts of the above mentioned co-agents per 100 parts of polymer of component a). Preferably with 0-5.0, more preferably with 0-2 parts of such co-agents.

The polymer composition of the present invention may further comprise at least one cross-linking agent different from the peroxide of the component b).

A cross-linking agent different from the peroxide of the component b) may include, for example, sulfur, sulfur compounds e.g. 4,4'-dithiomorpholine, tetramethylthiuram disulfide, dipentamethylenethiuram tetrasulfide, phenol-formaldehyde resins such as resols, nitroso compounds e.g. p-dinitrosobenzene, bisazides and polyhydrosilanes. One or more sulfur vulcanization accelerators can be present to assist the cross-linking, such as 2-mercaptobenzothiazole, N-cyclohexyl-2-benzothiazole sulfenamide and dibenzothiazole disulfide.

The presence of a further cross-linking agent may result in a further improved state of cure of the polymer compound and improved vulcanized polymer properties. Such improvement may originate from a synergistic effect of the cross-linking agents, a dual network formation by each individual cross-linking agent or the cure incompatibility of a polymer phase in the case of a polymer blend.

In a preferred embodiment of the invention the polymer composition may comprise in addition processing aids, blowing agents, fillers, softening agents, stabilizer and other components like waxes, tackifiers, desiccants, adhesives and coloring agents.

The processing aids include, for example, stearic acid and its derivatives. These processing aids may be used alone or in combination of two or more kinds. The amount of the processing aid is in the range of, for example, 0 to 20 phr, or preferably 1 to 10 phr.

The blowing agent includes organic blowing agents and inorganic blowing agents. Organic blowing agents include, azo blowing agents, such as azodicarbonamide (ADCA). The inorganic foaming agents include, for example, hydrogencarbonate, such as sodium hydrogencarbonate and ammonium hydrogencarbonate. These foaming agents may be present alone or in combination of two or more kinds. The amount of the additional blowing agent is preferably in the range of 0 to 20 phr.

The fillers include, for example, carbon black, carbon nano tubes, graphene, inorganic fillers, such as calcium carbonate, magnesium carbonate, calcium hydroxide, magnesium hydroxide, aluminium hydroxide, silicic add and salts thereof, clays, nano clays, talc, mica powder, bentonite, silica, alumina, aluminium silicate, acetylene black, and aluminium powder; organic fillers, such as cork, cellulose, reinforcing fibers like aramid, polyimide or polyester fibers and other known fillers. These fillers may be used alone or in combination of two or more kinds. The amount of the filler preferably is in the range of 0 to 300 phr, in particular 10 to 300 phr, preferably 50 to 200 phr, or more preferably 100 to 200 phr.

The softening agents include petroleum as (e.g. paraffin-based process oil like paraffin oil), naphthene-based process oil, drying oils or animal and vegetable oils (e.g. linseed oil), aromatic process oil, asphalt, low molecular weight polymers, organic acid esters (e.g. phthalic ester like di-2-octyl phthalate (DOP) or dibutyl phthalate (DBP), higher fatty acid ester, alkyl sulfonate ester and thickeners. Preferably petroleum oils, or more preferably paraffin-based process oil is used. These softening agents may be used alone or in combination of two or more kinds. The amount of the softening agent preferably is in the range of 0 to 200 phr, in particular from 10 to 200 phr, or preferably 20 to 100 phr.

The stabilizers include fire retardant, anti-aging agent, heat stabilizer, antioxidant and anti-ozonant. These stabilizers may be present alone or in combination of two or more kinds. The amount of the stabilizer preferably is in the range of 0 to 20 phr, in particular from 0.5 to 20 phr, or preferably 2 to 5 phr.

Preparation of the Composition

The invention also relates to a process for the manufacturing of the polymer composition according to the present invention wherein mixing its ingredients and kneading the mixture. In a preferred embodiment, the mixing process is performed in an internal mixer, in an extruder or on a mill.

Preparation of a Vulcanized Article

The invention also relates to a process for the manufacturing of a vulcanized article comprising the steps of shaping the vulcanizable polymer composition and vulcanizing the shaped rubber composition. The vulcanizable polymer composition is preferably prepared according to the present invention as mentioned above.

One embodiment of the invention relates to a process for the manufacture of a vulcanized article comprising the steps of preparing a vulcanizable rubber composition, shaping the vulcanizable rubber composition and vulcanizing the shaped rubber composition.

During kneading, the mixture of the ingredients of the vulcanizable polymer composition may also be heated. Preferably, mixing is performed by first kneading components other than additive components to be added in small amounts, such as, for example, cross-linking agents, blowing agents, accelerators and then adding these additive components to the kneaded mixture. Whereas the addition of the additive components can be done on the same mixing equipment, the cooling of the pre-mix and addition of additive components is easily performed on a second mixing device such as a 2-roll mill, Such use of a second mixing device is advantageous considering that the additive components are often heat sensitive and can thus be mixed to the composition at a lower temperature.

The polymer composition prepared according to the invention can be recovered from the mixing process in bulk or shaped in the form of sheets, slabs or pellets. The shaping of the polymer composition can take place after mixing, as an individual shaping step, ahead the vulcanization process or during the vulcanization process.

In a preferred embodiment, the shaping of the polymer composition is performed by extrusion, calendaring, compression molding, transfer molding or injection molding.

The elastomeric composition thus prepared is heated to a temperature at which the curing process takes place, so that a cross-linked polymer composition is obtained.

In a preferred embodiment the curing of the polymer composition is performed in a steam autoclave, an infra red heater tunnel, a microwave tunnel, a hot air tunnel, a salt bath, a fluidized bed, a mold or any combination thereof.

The vulcanization time of the vulcanizable polymer composition comprising a peroxide initiator is between 5 seconds and 30 minutes and the vulcanization temperature is in the range between 120 and 250° C. More preferably the vulcanization time is between 15 seconds and 15 minutes and the vulcanization temperature is in the range between 140 and 240° C. Most preferably the vulcanization time is between 1 and 10 minutes and the vulcanization temperature is in the range between 160 and 220° C.

The curing processes can be performed in any equipment that is known and suitable for curing of a polymer composition. This can be done either in a static process, as well as in a dynamic process. In the first case, mention can be made to curing in a predetermined shape, or thermoforming, by the use of a heated shape.

Preferably, the dynamic process comprises a shaping e.g. by extrusion continuously feeding the shaped polymer composition to a curing section (e.g. hot air tunnel). When an extruder is used for the shaping of the polymer composition, the temperature should be carefully controlled in order to prevent premature vulcanization e.g. scorch. The mixture is then heated to conditions where the polymer composition is vulcanized.

Optionally the cured composition is subjected to a post cure treatment that further extends the vulcanization time.

The method for curing the polymer composition is not particularly limited to the above processes. Alternatively the composition can be shaped into a sheet using a calander, or the like, and then be cured in a steam autoclave. Alternatively, the polymer composition can be formed into a complex shape, such as an uneven shape, by injection molding, press forming, or other forming method, and then be cured.

The invention also relates to a vulcanized article, prepared by the process according to the present invention. Characteristics of a vulcanized article according to the present invention are low compression sets at both low (−25° C.) and high (150° C.) temperatures and high tensile strength. Another characteristic is the good heat aging stability of the vulcanized material expressed by only limited deterioration of the tensile properties upon prolonged temperature treatment.

In a preferred embodiment the hardness of the vulcanizate is lower than 90 ShA, in particular in the range of 20 to 80 ShA, more particular from 30 to 70 ShA.

Typical applications for a vulcanized article according to the present invention are in the automotive segment, e.g. exhaust hangers, front light seals, air hoses, radiator hoses, sealing profiles, engine mounts and transmission belts, in the building and construction segment, e.g. seals building profiles and rubber sheeting, in wire and cables for electrical insulation, and in general rubber goods, e.g. conveyor belts, rollers, chemical linings and textile reinforced flexible fabrications.

EXAMPLES

General Procedure

The compositions of examples and comparative experiments for which rheometer data will be presented were prepared using an internal mixer either with a 50 ml volume (Brabender Plasticare PLE 651) with a set temperature of 50° C. The compositions of examples and comparative experiments for which full test data will be presented were prepared with a 3 liter volume (Shaw K1 Mark IV Intermix) with a starting temperature of 25° C. The elastomeric polymer was first introduced to the mixer and allowed to crumble for a period of 30 seconds before the carbon black, white filler and oil were added. Mixing was allowed to proceed until a mix temperature of 70° C. was achieved, when the remaining ingredients were added. Mixing was allowed to proceed until a mix temperature of 95° C. was achieved, when the batches were transferred to a two roll mill (Troester WNU 2) for cooling, and blending to achieve a high level of ingredient dispersion.

Analysis of cure rheology was carried out using a moving die rheometer (MDR2000E) with test conditions of 20 minutes at 180° C. The cure characteristics are expressed in ML, MH, MH-ML, ts2 and t'c(90), according to ISO 6502: 1999.

Test pieces were prepared by curing at 180° C. using a curing time equivalent to twice t'c90 as determined by MDR rheology testing in a compression mould.

The test pieces were used to determine physical properties reported in the tables.

If not mentioned otherwise, the standard procedures and test conditions were used for Hardness (ISO 7619-1:2004), Tensile strength (ISO 37:2005 via dumb-bell type 2), Tear strength (ISO 34-1:2010), Hot air aging (ISO 188:2007), Compression set (ISO 815-1:2008) and Mooney (ISO 289-1:2005).

Compositions and results of examples and comparative experiments are given in tables 1-5.

Table 1 shows the effect of zeolite activation on the rheometer data for a simple EPDM compound, containing 100 phr Keltan 8550 (an EPDM with 55 wt % ethylene, 5.5 wt % ENB and ML (1+4) @125° C. of 80 MU), 100 phr N-550 carbon black as filler and 70 phr paraffinic oil (Sunder 2280) with peroxide (amount and nature are given in Table 1) with and without zeolite 5A (see table 1). Examples 1 and 2 show that the addition of 10 phr of zeolite 5A results in an increase of (MH-ML), compared to the comparative examples A and B, for the peroxides tested (Perkadox 14-40MB-GR and Perkadox BC-40MB-GR), (MH-ML) is typically used in rubber technology as a measure for crosslink density and, thus, as a predictor for the physical properties of the corresponding vulcanizates. For all the peroxides (MH-ML) increases upon addition of zeolite. Comparison Example C in table 1 also shows that the addition of 10 phr of zeolite 13X having a pore size of about 10 Angstrom results in a decrease of (MH-ML), compared to the examples 3 and 4.

TABLE 1

| Example | peroxide | peroxide[1]) (phr) | zeolite (phr) | ts$_2$ [min] | t'c90 [min] | ML [dNm] | MH [dNm] | MH − ML [dNm] |
|---|---|---|---|---|---|---|---|---|
| Comp. A | Perkadox BC-40MB-GR | 5 | 0 | 2.14 | 4.25 | 1.32 | 4.33 | 3.01 |
| Comp. B | Perkadox 14-40MB-GR | 5 | 0 | 1.99 | 8.50 | 1.32 | 6.18 | 4.86 |
| 1 | Perkadox BC-40MB-GR | 5 | 5A (10) | 1.57 | 4.44 | 1.30 | 5.07 | 3.77 |
| 2 | Perkadox 14-40MB-GR | 5 | 5A (10) | 1.61 | 8.74 | 1.36 | 7.31 | 5.95 |
| Comp. C | Perkadox 14-40MB-GR | 5 | 13X (10) | 1.80 | 5.07 | 1.44 | 5.55 | 4.11 |
| 3 | Perkadox 14-40MB-GR | 5 | 4A (10) | 1.62 | 8.67 | 1.36 | 7.09 | 5.73 |
| 4 | Perkadox 14-40MB-GR | 5 | 3A (10) | 2.19 | 8.76 | 1.36 | 6.05 | 4.67 |

[1]) The amount corresponds to the commercial product, i.e. the pure peroxide amount has to be calculated by the contents given below accordingly
[2]) Perkadox 14-40MB-GR = Di(tert-butylperoxyisopropyl)benzene, granules, 40% with calcium carbonate, silica and EPDM
[3]) Perkadox BC-40MB-GR: Dicumyl peroxide, granules, 40% with calcium carbonate, silica and EPDM
[4]) Zeolite 5A: from Sigma Aldrich with maximum particle size of 50 micrometer Table 2 shows the effect of zeolite activation on the rheometer data for a series of simple EPDM compounds, containing 100 phr of EPDM with different diener, 100 phr N-550 carbon black, 70 phr Sunpar 2280 paraphinic oil and 5 phr of Perkadox 14-40MB-GR is used with and without zeolite 5A. Examples 5 and 6 show that the addition of 10 phr zeolite 5A results in an increase of (MH-ML) for both EPDMs with DCPD and VNB as diem monomers, as compared to the respective comparative examples D and E. Examples 7 and 8 show that the addition of 10 phr zeolite 5A results in an increase of (MH-ML) for the two EPDMs with 2.3% and 9% ENB, as compared to the comparative examples F and G.

TABLE 2

| Example | EPDM type | zeolite 5A (phr) | ts$_2$ [min] | t'c90 [min] | ML [dNm] | MH [dNm] | MH − ML [dNm] |
|---|---|---|---|---|---|---|---|
| Comp. D | DCPD grade (1) | 0 | 4.10 | 8.75 | 0.89 | 3.95 | 3.06 |
| 5 | DCPD grade (1) | 10 | 2.28 | 9.18 | 1.39 | 6.09 | 4.70 |

TABLE 2-continued

| Example | EPDM type | zeolite 5A (phr) | ts$_2$ [min] | t'c90 [min] | ML [dNm] | MH [dNm] | MH − ML [dNm] |
|---|---|---|---|---|---|---|---|
| Comp. E | VNB grade (2) | 0 | 1.24 | 8.11 | 1.27 | 8.78 | 7.51 |
| 6 | VNB grade (2) | 10 | 0.94 | 7.75 | 1.71 | 12.41 | 10.70 |
| Comp. F | ENB grade (3) | 0 | 6.55 | 8.31 | 0.96 | 3.37 | 2.41 |
| 7 | ENB grade (3) | 10 | 3.51 | 8.70 | 1.10 | 4.38 | 3.28 |
| Comp. G | ENB grade (4) | 0 | 1.67 | 8.98 | 1.37 | 7.30 | 5.93 |
| 8 | ENB grade (4) | 10 | 1.36 | 9.03 | 1.45 | 8.54 | 7.09 |

DCPD grade (1): EPDM with 58 wt % ethylene, 4.5 wt % DCPD and ML (1 + 4) @ 125° C. of 63 MU
VNB grade (2): EPDM with 50 wt % ethylene, 3 wt % VNB and ML (1 + 4) @ 125° C. of 80 MU
ENB grade (3): EPDM with 62 wt % ethylene, 2.3 wt % ENB and ML (1 + 4) @ 125° C. of 55 MU
ENB grade (4): EPDM with 48 wt % ethylene, 9.0 wt % ENB and ML (1 + 4) @ 150° C. of 60 MU Table 3 shows the effect of zeolite activation on the curing characteristics and the physical properties of a typical automotive sealing EPDM compound, containing a respective inventive polymer composition consisting of a blend of two EPDM polymers that is then used in a recipe with other ingredients to form a typical automotive sealing EPDM compound. Comparison of example 12 with comparative example K shows again an increase in rheometer (MH-ML) without any major effect on scorch and curing kinetics. The physical properties confirm the increase of crosslink density, as observed for (MH-ML), upon addition of the zeolite. Especially, the increase of the hardness and the modulus, which are maintained after hot-air ageing, is of technical interest.

TABLE 3

| recipe | | comparative example K | example 12 |
|---|---|---|---|
| Polymer comp. acc. to invention (exp. 12) | | | |
| Keltan 8550 EPDM[1] | [phr] | 70 | 70 |
| Keltan 2650 EPDM[2] | [phr] | 30 | 30 |
| Perkadox 14 40 MB-GR (peroxide)[6] | [phr] | 6 | 6 |
| Sigma Aldrich zeolite 5A | [phr] | 0 | 10 |
| N-550 carbon black | [phr] | 110 | 110 |
| Mistron R10C talk | [phr] | 55 | 55 |
| Sunpar 2280 paraphinic oil | [phr] | 65 | 65 |
| zinc oxide (UM) | [phr] | 5 | 5 |
| stearic acid | [phr] | 0.5 | 0.5 |
| polyethyleneglycol 4000 | [phr] | 2 | 2 |
| calcium oxide 80% MB[3] | [phr] | 5.5 | 5.5 |
| Trigonox 29 40 MB-GR (peroxide)[4] | [phr] | 3 | 3 |
| Saret 634 coagent[5] | [phr] | 5 | 5 |
| total compound | [phr] | 357 | 367 |
| ML (1 + 4) @ 100° C. | [MU] | 65.5 | 67.5 |
| t2 @ 125° C. | [min] | 3.92 | 3.98 |
| t5 @ 125° C. | [min] | 4.52 | 4.49 |
| t35 @ 125° C. | [min] | 8.47 | 7.38 |
| rheometer @ 180° C. | | | |
| ML | [dNm] | 1.87 | 1.96 |
| MH | [dNm] | 15.91 | 17.39 |
| MH − ML | [dNm] | 14.04 | 15.43 |
| ts2 | [min] | 0.28 | 0.26 |
| t'c(90) | [min] | 4.52 | 4.13 |
| vulcanisate (2x t90 @ 180° C.) | | | |
| hardness | [ShoreA] | 71.8 | 73.0 |
| tensile strength | [MPa] | 12.2 | 11.1 |
| modulus at 100% | [MPa] | 5.1 | 5.8 |
| modulus at 300% | [MPa] | 12.1 | 0 |
| elongation at break | [%] | 306 | 274 |
| tear strength angle nicked | [N] | 20.8 | 19.5 |
| compression set 24 hr @ 150° C. after ageing (24 hr hot air @ 150° C.) | [%] | 35.4 | 38.6 |
| hardness | [Shore A] | 73.5 | 75.6 |
| tensile strength | [MPa] | 11.4 | 9.9 |
| modulus at 100% | [MPa] | 4.9 | 5.8 |
| modulus at 300% | [MPa] | 10.3 | 0 |
| elongation at break | [%] | 338 | 262 |
| tear strength angle nicked | [N] | 24.8 | 22.5 |

[1]Keltan 8550 EPDM: EPDM with 55 wt % ethylene, 5.5 wt % ENB and ML (1 + 4) @ 125° C. of 80
[2]Keltan 2650 EPDM: EPDM with 53 wt % ethylene, 6.0 wt % ENB and ML (1 + 4) @ 125° C. of 25
[3]calcium oxide 80% MB ---> calcium oxide (80%) coated by special dispersing agents (commercial name: Kezadol GR/DAB)
[4]Trigonox 29 40 MB-GR = 1,1-di(tert-butylperoxy)-3,3,5-trimethylcyclohexane, granules, 40% on calcium carbonate and silica
[5]Saret 634 coagent ---> zinc dimethacrylate coagent
[6]Perkadox 14 40 MB-GR = di(tert-butylperoxyisopropyl)benzene, granules, 40% with calcium carbonate and silica Table 4 shows the effect of zeolite activation on the curing characteristics and the physical properties of a typical EPDM moulding compound for automotive interior applications containing a respective inventive polymer composition, consisting of a blend of three EPDM polymers without any oil plasticizer that is then used in a recipe with other ingredients to form a typical EPDM moulding compound for automotive interior applications. Comparison of example 13 with comparative example L shows again an increase in rheometer (MH-ML) without any sacrifice for scorch and curing kinetics upon addition of the zeolite. The physical properties confirm the increase of crosslink density, as observed for (MH-ML), upon addition of the zeolite. Especially, the increase of the hardness, the moduli and the tear strength, which are maintained after hot-air ageing, and the improvement of the compression set are of technical interest.

TABLE 4

| recipe | | comparative example L | example 13 |
|---|---|---|---|
| Polymer comp. acc. to invention (exp. 13) | | | |
| Keltan 2650 EPDM[1] | [phr] | 27.26 | 27.26 |
| Keltan 0500R EPDM[2] | [phr] | 9.1 | 9.1 |
| Keltan 2470L EPDM[3] | [phr] | 63.64 | 63.64 |
| Perkadox 14 40 MB-GR[8] | [phr] | 1.82 | 1.82 |
| Sigma Aldrich zeolite 5A | [phr] | 0 | 10 |
| N-347 carbon black | [phr] | 13.64 | 13.64 |
| N-550 carbon black | [phr] | 18.18 | 18.18 |

TABLE 4-continued

| recipe | | comparative example L | example 13 |
|---|---|---|---|
| Aktiplast T[4] | [phr] | 0.91 | 0.91 |
| sulphur 80% MB[5] | [phr] | 0.09 | 0.09 |
| Ricobond 1756HS[6] | [phr] | 2.73 | 2.73 |
| Trigonox101 45 MB[7] | [phr] | 1.82 | 1.82 |
| total compound | [phr] | 139.19 | 149.19 |
| ML (1 + 4) @ 100° C. | [MU] | 27.2 | 46.6 |
| t2 @ 125° C. | [min] | 30.9 | 35.43 |
| t5 @ 125° C. | [min] | 50.23 | 52.88 |
| rheometer @ 180° C. | | | |
| ML | [dNm] | 0.72 | 0.8 |
| MH | [dNm] | 18.42 | 21.52 |
| MH − ML | [dNm] | 17.7 | 20.72 |
| ts2 | [min] | 0.72 | 0.67 |
| t'c(90) | [min] | 6.71 | 6.85 |
| vulcanisate (2x t90 @ 180° C.) | | | |
| hardness | [Shore A] | 60.8 | 63.9 |
| tensile strength | [MPa] | 16.9 | 16.4 |
| modulus at 100% | [MPa] | 2.4 | 3.0 |
| modulus at 300% | [MPa] | 14.6 | 16.2 |
| elongation at break | [%] | 321 | 302 |
| tear strength angle nicked | [N] | 9.8 | 11.2 |
| compression set 24 hr @ 150° C. | [%] | 20.3 | 17.2 |
| after ageing (24 hr hot air @ 150° C.) | | | |
| hardness | [ShoreA] | 62.1 | 64.9 |
| tensile strength | [MPa] | 16.5 | 15.9 |
| modulus at 100% | [MPa] | 2.5 | 3.1 |
| modulus at 300% | [MPa] | 15.6 | 16.0 |
| elongation at break | [%] | 311 | 289 |
| tear strength angle nicked | [N] | 9.8 | 11.2 |

[1] Keltan 2650 EPDM: EPDM with 53 wt % ethylene, 6.0 wt % ENB and ML (1 + 4) @ 125° C. of 25
[2] Keltan 0500R EPDM: EPM with 49 wt % ethylene and MFI @ 125° C. with 2.16 kg of 11
[3] Keltan 2470L EPDM: EPDM with 69 wt % ethylene, 4.2 wt % ENB and ML (1 + 4) @ 125° C. of 22
[4] Aktiplast T: lubricant consisting of combination of zinc salts of unsaturated fatty acids with melting point range of 78-96° C.
[5] sulphur 80% MB: 80% active sulphur masterbatch on EPDM and EVAc binder
[6] Ricobond 1756HS: 70% active maleinised liquid polybutadiene with 70% vinyl and 100 meq KOH/gram polymer
[7] Trigonox 101-45B-GR = 2,5-dimethyl-2,5-di(tert-butylperoxy)hexene, 45% masterbatch on calcium carbonate and silica
[8] Perkadox 14 40 MB-BR = di(tert-butylperoxyisopropyl)benzene, granules, 40% with calcium carbonate and silica

What is claimed is:

1. A vulcanizable polymer composition comprising:
   a) an elastomeric polymer having an iodine value of lower than 400 g/100 g polymer, whereby the elastomeric polymer is an M-type rubber (per ISO 1629) having a polyethylene-type saturated carbon chain;
   b) an organic peroxide selected from the group consisting of: di(tert-butylperoxyisopropyl)benzene, tert-butyl peroxybenzoate, tert-butyl cumyl peroxide, dibenzoyl peroxide, di(2,4-dichlorobenzoyl) peroxide, di(4-methylbenzoyl) peroxide, and mixtures thereof; and
   c) a zeolite having pore sizes of 3 to 6 Å.

2. The vulcanizable polymer composition according to claim 1, wherein the elastomeric polymer is a copolymer of ethylene, one or more C3 to C23 α-olefins and polyene.

3. The vulcanizable polymer composition according to claim 2, wherein the elastomeric polymer is a copolymer of ethylene, propylene and a polyene.

4. The vulcanizable polymer composition according to claim 1, wherein the elastomeric polymer is ethylene, propylene, diene rubber.

5. The vulcanizable polymer composition according to claim 1, wherein the organic peroxide is di(tert-butylperoxyisopropyl)benzene.

6. The vulcanizable polymer composition according to claim 1, wherein the zeolite has pore sizes of 3.5 to 5.5 Å.

7. The vulcanizable polymer composition according to claim 6, wherein the zeolite is a zeolite A type.

8. The vulcanizable polymer composition according to claim 1, wherein:
   the elastomeric polymer is a copolymer of ethylene, propylene and polyene;
   the organic peroxide is di(tert-butylperoxyisopropyl)benzene; and
   the zeolite has pore sizes of 3.5 to 5.5 Å.

9. The vulcanizable polymer composition according to claim 8, wherein the zeolite is zeolite type 4A and/or zeolite type 5A.

10. The vulcanizable polymer composition according to claim 9, wherein the composition comprises:
    0.1 to 10 parts organic peroxide per hundred parts elastomeric polymer; and
    0.1 to 20 parts zeolite per hundred parts elastomeric polymer.

11. A vulcanizable polymer composition comprising:
    a) an elastomeric polymer comprising a copolymer of ethylene, one or more C3 to C23 α-olefins and polyene;
    b) di(tert-butylperoxyisopropyl)benzene; and
    c) a zeolite having pore sizes of 3 to 6 Å.

12. The vulcanizable polymer composition according to claim 11, wherein the zeolite is zeolite type 4A and/or zeolite type 5A.

13. A process for the manufacture of a vulcanized article from the vulcanizable polymer composition according to claim 1, the process comprising:
    shaping the vulcanizable polymer composition according to claim 1; and
    vulcanizing the shaped polymer composition.

14. The process according to claim 13, wherein the shaping comprises at least one of: extrusion, calendaring, compression molding, transfer molding, transfer molding, injection molding.

15. A vulcanized article produced by the process according to claim 13.

16. The vulcanizable polymer composition according to claim 1, further comprising:
    d): a filler present in an amount of 100-300 parts per hundred parts elastomeric polymer, and
    wherein the zeolite is present in an amount of 0.1 to 20 parts per hundred parts elastomeric polymer.

* * * * *